United States Patent [19]

England et al.

[11] Patent Number: 5,555,411
[45] Date of Patent: Sep. 10, 1996

[54] INITIALIZING PROGRAMS HAVING DEPENDENCIES

[75] Inventors: Laurence E. England; Andrew J. Lang; Alfred W. Shannon, all of Morgan Hill, Calif.

[73] Assignee: International Business Machines Corporation, Armonk, N.Y.

[21] Appl. No.: 414,297

[22] Filed: Mar. 31, 1995

Related U.S. Application Data

[62] Division of Ser. No. 79,480, Jun. 18, 1993, Pat. No. 5,428, 780, which is a continuation of Ser. No. 796,098, Nov. 21, 1991, abandoned.

[51] Int. Cl.$^6$ ............................................. G06F 9/00
[52] U.S. Cl. ................................................. 395/650
[58] Field of Search ........................................ 395/650

[56] References Cited

U.S. PATENT DOCUMENTS

| | | | |
|---|---|---|---|
| 4,636,948 | 1/1987 | Gdaniec et al. | 395/650 |
| 4,833,594 | 5/1989 | Familetti et al. | 395/700 |
| 4,885,684 | 12/1989 | Austin et al. | 395/650 |
| 4,916,610 | 4/1990 | Bapat | 395/700 |
| 4,943,913 | 7/1990 | Clark | 395/700 |
| 4,970,639 | 11/1990 | Diefendorf et al. | 395/700 |
| 4,992,971 | 2/1991 | Hayashi | 364/419.02 |

OTHER PUBLICATIONS

Knuth, D. E., *Fundamental Algorithms*, "The Art of Computer Programming", vol. 1, pp. 258–265, 1975.
Individuals With University of Berkley, *UNIX Programmers Manual Supplementary Documents 1*, USENIX Association, pp. PS1:12–11 to PS1:12–9, 1986.
Employees of Borland International, *Turbo C++ Programmers Guide*, pp. 140–142, 1990.

*Primary Examiner*—Alvin E. Oberley
*Assistant Examiner*—John Q. Chavis
*Attorney, Agent, or Firm*—Sterne, Kessler, Goldstein & Fox P.L.L.C.

[57] ABSTRACT

Method and means are described which provide a way for an application program to be generated to include dependent control blocks which indicate which support programs must be initialized in the run-time support environment prior to the application program's initialization and which must be terminated after its termination. Since support programs may be dependent on each other, a topological sort is performed to determine an order in which the support programs can be initialized so that no routine is initialized before all of its prerequisites are initialized. The initialization order is saved, so that following the execution of the program, termination can be performed in the reverse order.

9 Claims, 4 Drawing Sheets

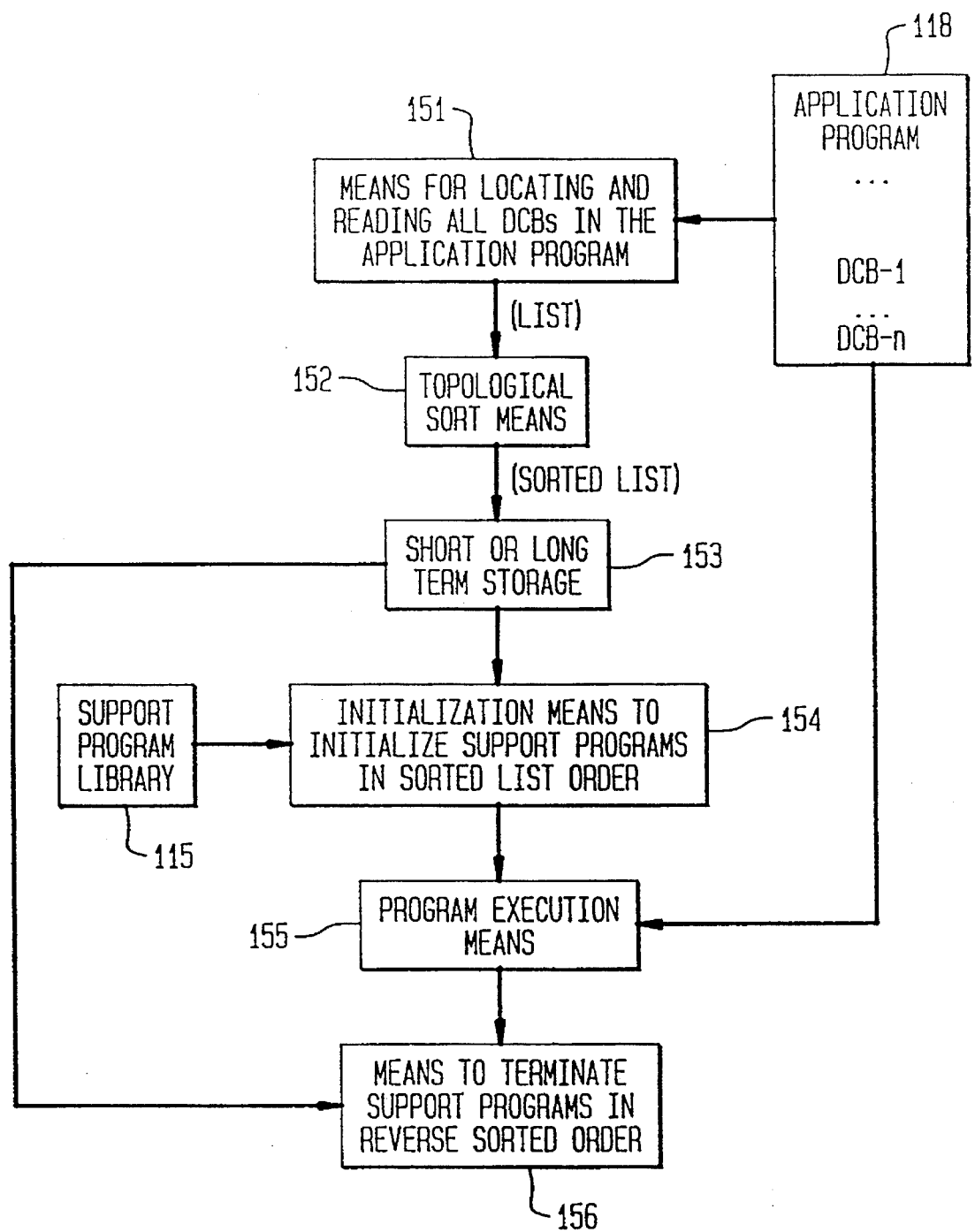

INITIALIZING PROGRAMS HAVING DEPENDENCIES

This application is a division of application Ser. No. 08/079,480, filed Jun. 18, 1993, which is allowed, U.S. Pat. No. 5,428,780, which is a continuation of application Ser. No. 07/796,098, filed Nov. 21, 1991, now abandoned.

TECHNICAL FIELD

The present invention relates to methods and systems in the field of program execution management in a computer system.

BACKGROUND OF THE INVENTION

There are various high level languages which are in wide use for computer programming, e.g., C, COBOL, FORTRAN, PL/I, PASCAL, etc. Computer programs may be written in more than one of these languages. Execution of programs written in these languages normally requires that language specific run-time support code by present and initialized to enable the code produced by the respective compilers to function correctly. It is desirable to allow for the language specific run-time support code to be written in multiple languages, but this presents special problems. Termination ordering also presents similar problems.

During initialization and termination of a multi-language application program, language specific initialization and termination routines are called for each language in the application. When the language specific routine for a particular language requires support provided by a second language then the second language' support must be initialized before the first language's support is initialized and terminated only after the first language's support has been terminated.

The idea of ordering based on dependencies is known. Knuth, for example, describes the problem in *The Art of Computer Programming*, Vol. 1, Addison-Wesley, 1975, pages 258–265. Knuth describes the problem of topological sorting of a set on which a partial ordering is defined. The goal is to find a linear sequence of the members of the set such that any item in the sequence will precede another in the sequence if the one is defined to precede the other in the partial ordering. Knuth describes an algorithm for topological sorting.

The problem of initialization ordering is related to topological sorting. The dependency that one language has upon the initialization of another defines a partial ordering between the languages. Termination can then be performed in the reverse order.

It is also possible for programs to have dependencies on support programs which are unrelated to language support as such. Dependency on a debugging program would be an example of this.

It is conventional in the computer science field to use control blocks (sometimes called headers) containing non-executable code to convey information needed to execute a program. Control blocks which give initial information about a program are sometimes called program headers.

The term "applicable program" (or simply "application") will be used to include both end-user developed computer programs and computer programs which are sometimes called system programs, such as compilers. For convenience, the term "program" will be used to include routines or modules which in other contexts might not be considered to be programs. Thus, language specific run-time support routines will be called programs even though they may be inherently incapable of independent execution.

SUMMARY OF THE INVENTION

The invention provides a way for an application program to be generated. A method is described that will initialize and terminate the prerequisite programs, including language specific support routines, for a single or multi-language application that will satisfy the dependencies. A set of control blocks is defined which is associated with an application program. These control blocks contain information which allows a common run-time initialization routine to ascertain the prerequisites upon which the application depends. Each DCB can contain information specific to the compiler, assembler or other program which generated associated executable object code. The DCB lists the prerequisite programs on which the executable object code depends. The object code for the DCB is preferably given a symbolic name for subsequent reference by a linkage editor. The DCBs may be implicitly associated with a language or other support program, so that there is no need for explicitly declare the associated language in its dependent list. The executable object code with its DCBs is preferably linked together with object code produced by other programs with their associated DCBs. The initialization of the application program requires reading all of the DCBs included in the application program to determine all prerequisite language support and other routines needed by the application. The order of initialization of prerequisite routines is determined by performing a topological sort using the inter-dependencies to obtain an order in which initialization can occur such that no routine is initialized before all of its prerequisites are initialized. The initialization order is saved, so that following the execution of the application program termination can be performed in the reverse order.

The run-time environment initialization program must be able to locate all of the DCBs included in an application program. Any convenient means may be used for communicating this information to the initialization program. The method and means described in detail for doing this is to include in a program header the address of a language list which in turn contains the addresses of all of the DCBs.

BRIEF DESCRIPTION OF THE DRAWINGS

FIG. 5 illustrates the structure of a system for initializing the support programs for a program containing DCBs.

DETAILED DESCRIPTION OF THE EMBODIMENT

Figure 1:
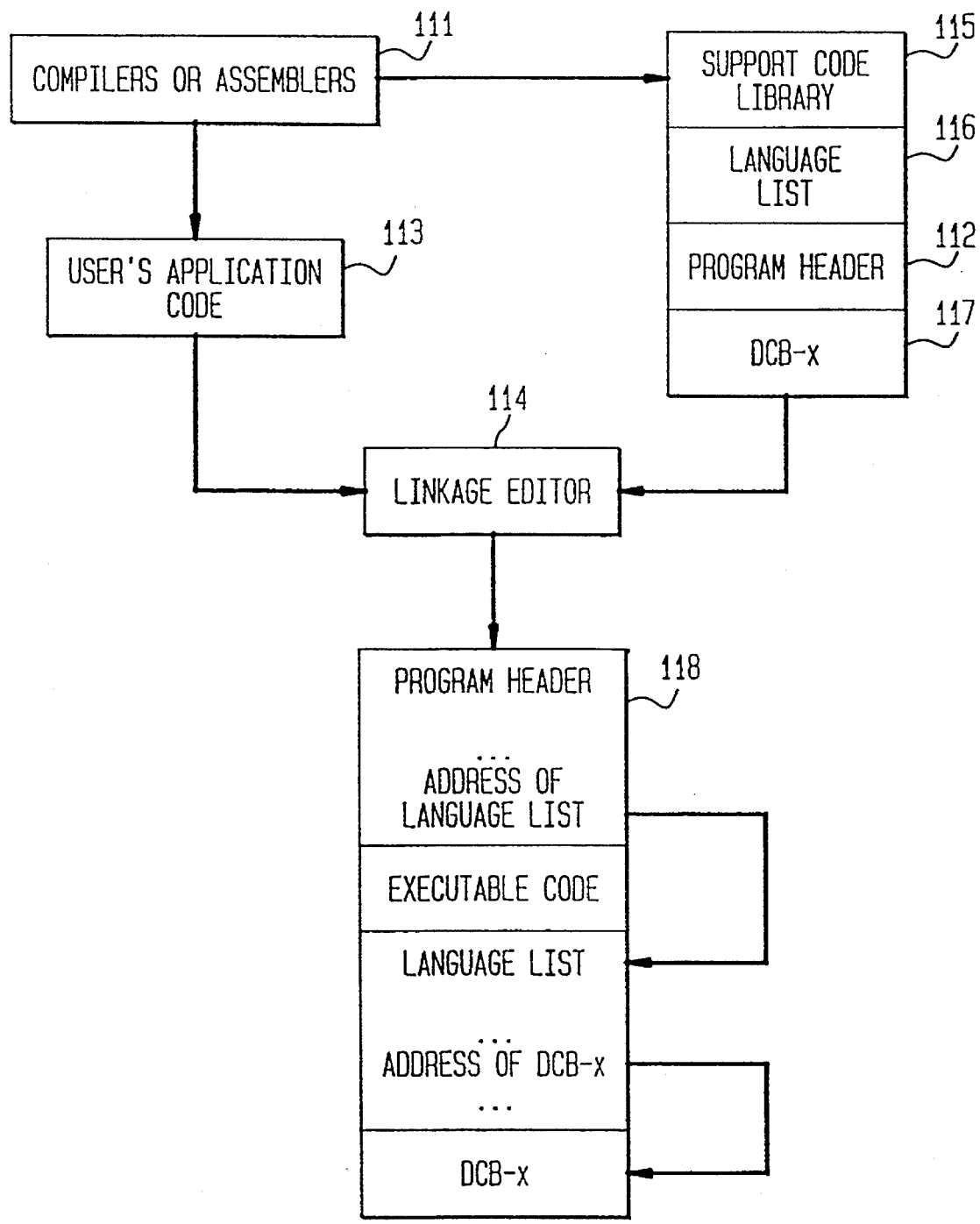
FIG. 1 illustrates the process of preparing application program object code containing a dependency control block (DCB).

The invention is preferably implemented as a part of a larger common run-time environment, which will be called the Common Execution Environment (CEE) for system and application programs which may be written in multiple High-Level Languages (ILLL). The invention is suitable for use on any size computer from mainframes to personal computers. CEE consists of common services which can be shared by all programs regardless of the language in which they are written. The system library available to the user also includes language specific support routines (LSRs), and other support programs which collectively will be called support programs. The invention is independent of operating systems and programming languages and can be applied to any multi-language run-time environment.

When an application begins executing, it must first initialize CEE before it can use any of the CEE provided services. This can be effected through any standard means of transferring program control. In the detailed embodiment, it is done by calling an arbitrary external symbolic label reserved for use by CEE and passing information in registers which allows CEE to find the program header. When the application completes, it invokes the termination service of CEE in a similar manner. When CEE begins, it first initializes the common services, then, for each language in the application, it determines the LSR for that language. Only the LSRs required by the application are initialized. Similarly, during termination, CEE first terminates the LSRs and then the common services.

An LSR can be written in any language within certain restrictions. The LSRs can take advantage of common CEE services, since they are initialized before language specific components. But the LSR cannot, in general, take advantage of features of the language in which it is written unless that language is already initialized. For example, if the language specific support routines for COBOL were written in C, then initialization for applications that include COBOL routines would have to include initializing the C specific support routines first. The prior art does not teach a way to communicate this type of dependency to a common initialization program. Similarly requiring debugging support might require that LSRs be initialized to support the code in the debugger.

To solve this problem a means is provided for compilers for each language used in an application to indicate which other LSRs and support routines must be initialized prior to its initialization. The full list of support routines needed by an application is determined along with each one's dependencies, then a topological sorting method is used to determine an initialization order that will satisfy the dependencies as indicated by each control block.

For each language required by a multi-language application, a language specific control block is statically bound with the application. These can be accessed by CEE during initialization by way of the parameters passed to CEE initialization routine. Each language specific component in CEE is identified by a unique member identifier. Within each of the language specific control blocks is a table of member identifiers indicating which support programs must be initialized before that member can be initialized. Thus, during initialization, CEE can determine the dependencies between all the languages in the application.

FIG. 1 shows the process of preparing object code containing a control block which lists the programs on which then executable object code is dependent. This control block will be called the dependency control block (DCB). The support code library 115 consists of executable object code for language specific support routines or other programs which might be typically stored on non-volatile storage, e.g., disk drives, for repeated subsequent use. The language list 116, which is shown in detail in Table 4, is used to create a table of addresses for all of the DCBs contained in the final program 118. Only one DCB is shown and is labelled DCB-x 117, but in practice there will be multiple DCBs. The support code, language list, and the DCBs are produced using standard compilers and/or assemblers 111. The user uses the compilers and/or assemblers to create custom object code with an associated program header 112. A general purpose program header may be used or a program header specific to the compiler may be used, but in either case it is typically pre-compiled and included in the library. The user code is then combined with executable code from the library along with the language list and the approximate DCBs through the use of a standard linkage editor 114 to produce the user's program 118 which consists of linked executable object code, the non-executable code of the program header, the language list, and the DCBs. The program header contains a pointer to the language list which in turn has a pointer to the DCB.

Figure 2:
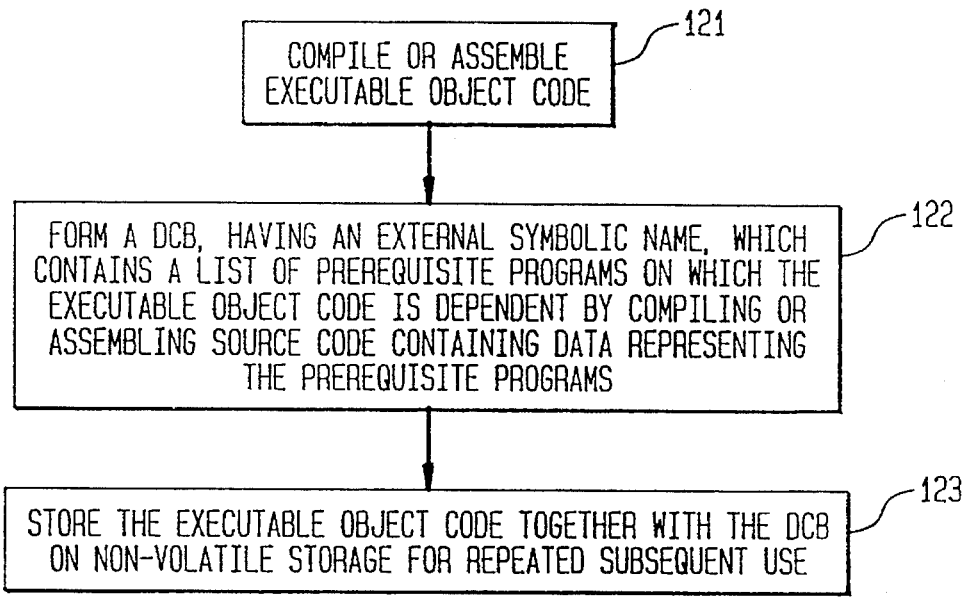
FIG. 2 illustrates the process of forming a DCB.

FIG. 2 describes the steps of preparing executable object code and an associated DCB. Compiling the executable object code 121 is done according to the prior art practice. The forming of the DCB 122 is achieved by compiling or assembling source code, such as is shown in Table 2, to produce an object module which has an extended symbolic name and contains data representative of the prerequisite programs on which the executable object code is dependent. Since it will normally be the case that the executable code and the DCB will be part of a collection of programs which will be used repeatedly over a long period of time, they should be stored 123 together on non-volatile storage such as a disk drive. If the information about the dependencies of the executable object code are known prior to compilation, the DCB may be created first.

Figure 3:
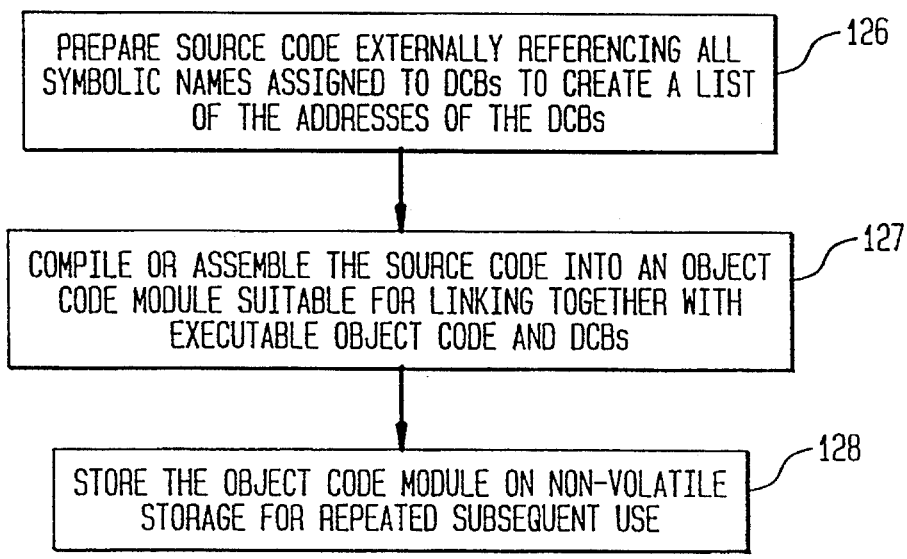
FIG. 3 illustrates the process of forming a language list referencing all possible DCBs.

The language list acts to create a list of all of the DCBs that ultimately are combined into a single program. Any mechanism which allows the CEE to locate all of the DCBs will work. Applicants' detailed embodiment described herein uses a language list which is a separate object module. In another embodiment the function of the language list could be combined into the program header, for example. FIG. 3 shows the process of creating the language first. Source code for the language list, such as is shown in Table 4, is prepared 126, compiled or assembled 127 and stored for repeated subsequent use 128.

Any CEE has initialized the common services component, it initializes all language specific components or members in the application using the method described in pseudo-code in Table 1. By virtue of the loop in lines 10–14 all required support programs for the application will be initialized. By virtue of the first when clause 17, a member support program is not initialized until all members it depends upon are initialized. By virtue of the second when clause 25, if there is a member with a dependency directly or indirectly upon itself (a circular dependency), it will be detected.

Satisfying termination dependencies is a similar problem. A support program must terminate before any support program that it depends upon. To solve this problem, the initialization order is saved in memory for use at termination time. The support programs are terminated in the reverse order from initialization.

TABLE 1

10   mark all members uninitialized
11   for each member, M, required by the application
12       call Initialize Member (M)

TABLE 1-continued

```
13   end for
14   exit
     /***************************************/
     /* Initialize Member logic. */
15   Initialize Member (M)
16     select
17       when M is uninitialized
18         mark M initializing
19         for each member M' on which M depends
20           call Initialize Member (M')
21         end for
22         initialize M
23         mark H initialized
24         record the order in which M was initialized
25       when M is initializing
26         handle error: cyclic dependency
27       when M is initialized
29         nop
30     end select
31     return
     end
```

The form of the control block which lists dependencies is not critical. Any format may be substituted that provides the same dependency information. In the detailed embodiment described herein in detail, the control block is statically linked into the application, but in an alternative embodiment, it may be provided dynamically and read at execution time.

The particular algorithm used to determine the order for member initialization is not critical so long as it meets the requirement of not initializing any program before all of its dependencies have been initialized. Any algorithm that will perform a topological sort will work. Languages may either be initialized as each member is placed in final sorted order, of the members may be first sorted and then initialized in their sorted order. What is important is that the members be initialized in topological sorted order.

In the detailed embodiment the members to be initialized are communicated to the initializing routine through a control block which contains non-executable code. Table 2 shows an example, in standard IBM assembler language, of a DCB listing three dependencies. At line 105 a unique four character string is used to identify the particular compiler or other program to which the DCB belongs. This association implicitly identifies the specific support routine for the compiler. If, for example, the CEESG004 DCB has been assigned to the REXX compiler, the CEE automatically knows that the LSR for REXX, if any exists, must be initialized before the application containing this DCB can be executed. The total number of dependencies is listed as three at line 108. The dependencies are listed at lines 113–115 as coded integers 1, 2, and 5. These numbers are arbitrarily assigned to correspond to certain programs or language specific components. Thus, "1" might correspond to C specific support, "2" to FORTRAN specific support and "5" to COBOL specific support. It is essential to the functioning of the described embodiment that a predetermined list of these codes be available so that each programmer creating a DCB will know what numerical codes to put in the DCB to correctly indicate the dependencies. An alternative embodiment could use codes that are self-defining by, for example, putting character strings in the list which give the full name of the program so that the initialization program can uniquely identify the program which it needs to load without further extrinsic information. Self-defining codes also have the advantage that they can be dynamically built and updated.

TABLE 2

```
101   CEESG004   CSECT
102   CEESG004   AMODE   ANY
103   CEESG004   RMODE   ANY
104   * * * * * * * * * * * * * * * * * * * * * * * * * * * * * * * * * * *
105              DC      CL4'S004'
106              DC      H'23'                      length of this csect
107              DC      H'1'                       version
108              DC      H'3'                       Number of dependent member IDs
109              DC      Y(DEPIDS-CEESG004)         Offset to the first dep.member ID
110              DC      XL4'0'                     Reserved for member use
111              DC      XL4'0'                     Reserved for member use
112   DEPIDS     EQU     *                          List of ids dependent upon
113              DC      FL1'1'                     Program assigned code '1'
114              DC      FL1'2'                     Program assigned code '2'
115              DC      FL1'5'                     Program assigned code '5'
116              END
```

Each program requesting initialization must have a program header such as the one listed in Table 3. Any format of header will work. The only piece of information in this header used in the invention is the address of CEELLIST at x+40 which is the language list.

TABLE 3

```
              START    CSECT
              START    AMODE    ANY
              START    RMODE    ANY
    000000             NOP      0
    000004             NOP      y
    000008             STM      14,12,12(13)    Save caller regs
    00000C             BALR     3,0
                       USING    *,3
```

TABLE 3-continued

| | | | | |
|---|---|---|---|---|
| 00000E | | B | AROUND | Branch around signature |
| 000012–17 | | ... | | unrelated data |
| 000018 | | DC | A(PLIST) | Point to PLIST |
| 00001C | | DC | CL8'START' | Eye-catcher |
| 000020 | | DC | H'0' | Reserved |
| | AROUND | EQU | * | |
| | | ... | | |
| | | member code | | |
| | | ... | | |
| x | PLIST | DS | 0F | |
| x+00 | | ... | | unrelated data |
| x+10 | | CXD | | |
| x+14 | | DC | H'–1' | |
| x+16 | | DC | AL2(PLIST_LEN) | |
| x+18 – 3C | | ... | | unrelated data |
| x+40 | | DC | A(CEELLIST) | List of weak externals showing |
| | * | | | ... languages in load module |
| 0+44 | | ... | | |
| | PLIST_LEN EQU *-PLIST | | | Length of Parm List |

The format of the CEELLIST language list is shown in Table 4. The order of the entries in the language list in the detailed embodiment corresponds to the codes assigned for use in the DCBs, but the order is unimportant. CEELLIST can contain entries for programs other than language specific support routines. In the sample list in Table 4, the sixth entry in the list corresponds to a debugging program. Entries do not need to be assigned at all; thus, entry one is listed as unassigned. The DCB shown in Table 2 is labelled CEESG004 and corresponds to the fifth entry in the list. When the DCB's with the proper labels are linked into a module with CEEBLLIST the addresses of those DCB's present will be placed in the list by conventional linkage software. CEE will fine zeroes in the list for all DCBs not present in the module. Using the DCB address CEE can then easily find the list of dependency codes and mark those requiring initialization for input into the topological sorting routine of Table 1. The "WXTRN" keyword is conventionally supported by assemblers and linkage editors for computers in IBM'System/370 family and is used to indicate a weak external reference. The linkage editor will attempt to link these external references, but will only issue a warning if they are not found.

TABLE 4

| | | | CEE LANGUAGE LIST HEADER |
|---|---|---|---|
| CEEBLLST | CSECT, | | |
| CEEBLLST | RMODE ANY | | |
| CEEBLLST | AMODE ANY | | |
| | ... | | |
| * Start of the actual Language List | | | |
| | ENTRY | CEELLIST | |
| CEELLIST | DS | 0D | CEE LANGUAGE LIST |
| | WXTRN | CEESG000 | |
| | DC | A(CEESG000) | 00 unassigned |
| | WXTRN | CEESG001 | |
| | DC | A(CEESG001) | 01 common services |
| | WXTRN | CEESG002 | |
| | DC | A(CEESG002) | 02 compiler-x |
| | WXTRN | CEESG003 | |
| | DC | A(CEESG003) | 03 compiler-y |
| | WXTRN | CEESG004 | |
| | DC | A(CEESG004) | 04 program-x |
| | WXTRN | CEESG005 | |
| | DC | A(CEESG005) | 05 compiler-z |
| | WXTRN | CEESG006 | |
| | DC | A(CEESG006) | 06 compiler-j |
| | WXTRN | CEESG007 | |
| | DC | A(CEESG007) | 07 compiler-k |
| | WXTRN | CEESG008 | |
| | DC | A(CEESG008) | 08 compiler-l |
| | WXTRN | CEESG009 | |
| | DC | A(CEESG009) | 09 compiler-m |
| | WXTRN | CEESG010 | |
| | DC | A(CEESG010) | 10 compiler-n |
| | WXTRN | CEESG011 | |
| | DC | A(CEESG011) | 11 Debugger |
| | WXTRN | CEESG012 | |
| | DC | A(CEESG012) | 12 compiler-o |
| | WXTRN | CEESG013 | |
| | DC | A(CEESG013) | 13 compiler-p |
| | WXTRN | CEESG014 | |
| | DC | A(CEESG014) | 14 compiler-q |
| | WXTRN | CEESG015 | |
| | DC | A(CEESG015) | 15 assembler |
| | WXTRN | CEESG016 | |
| | DC | A(CEESG016) | 16 compiler-r |
| | DC | A(0) | Dummy entry must contain X'00' |
| | DS | 0D | This boundary requirement is mandatory. |
| * | | | It is needed to save processing time when |
| * | | | CEE is being initialized. |
| LLISTEND | DC | A(0) | MARK THE END OF LIST |
| | END | | |

Figure 4:
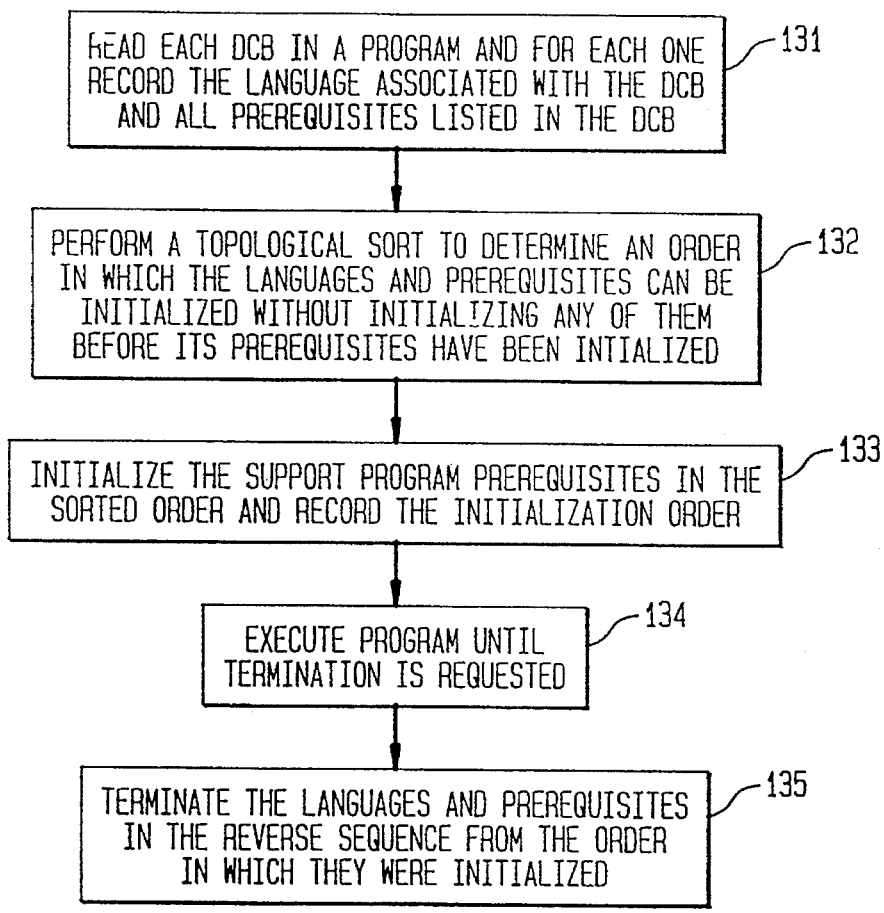
FIG. 4 illustrates the process of initializing the support programs for a program containing DCBs.

FIG. 4 shows the steps executed by CEE in initializing an application program containing DCBs. First, all of the DCBs must be located and a list of all prerequisites is made 131. In the detailed embodiment this step required first reading the program header to find the address of the language list, then using the language list to determine the number of DCBs present in the program and the location of each one. The topological sort is performed 132 to find an order in which initialization can occur without violating any dependency relationship. The support programs are initialized in the order determined by the topological sort and the order is saved for later use 133. Control is returned to the application program 134. When its execution is completed, the application returns control to CEE to allow termination of the support programs. Each support program must have a defined mechanisms for allowing CEE to initialize and terminate it. This is preferably done through a standard call and return mechanism. CEE terminates the support programs in the reverse order from the initialization order 135.

FIG. 5 is a block diagram showing the overall structure and inter-relationships of the functional units required to initialize a program using DCBs. The locating and reading means 151 passes an unordered list of support programs to the topological sorting means 152. The generated sorted list is stored in memory 153, e.g., RAM or disk. The initialization means 154 uses the sorted list to determine which support programs are to be initialized from the library 115. The library is simply the collection of support programs which will typically be stored on disk. Control begins with the application program which must call CEE to activate the sequence. After initialization the application program regains control 155 until it is ready to request termination. The termination means 156 must have access to the previously stored sorted list.

Figure 6:
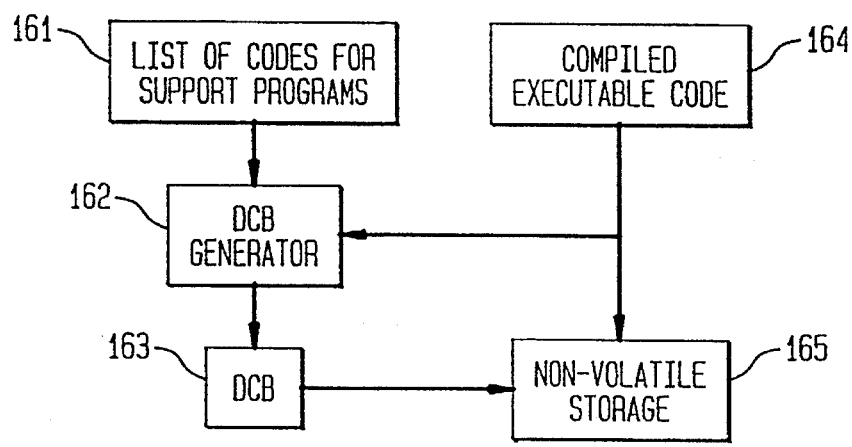
FIG. 6 illustrates the structure of a system for creating DCBs and combining them with executable object code.

FIG. 6 is a block diagram of the functional units required to generate a DCB. A list of codes for the support programs 161 is used by the DCB generator 162 in conjunction with the executable object code 164 to generate the DCB 163 which encodes the dependencies. The DCB is then stored together with executable object code on non-volatile storage for subsequence use 164.

Some advantages that the invention has over prior art techniques are:
- Components of a language runtime environment may themselves be written in a high level language or even multiple languages.
- Only those language specific components of the runtime environment that are necessary for the execution of the application need be initialized thereby saving execution time.

- When a routine is called in an application, it need not first check whether its language specific support is initialized, also saving execution time.
- The control block usage requires minimal or no changes to compilers.

Using the foregoing specifications the invention may be implemented using standard programming techniques. The resulting program(s) may be stored on disk, diskettes, memory cards, ROM or any other memory device. For execution the program may be copied into the RAM of the computer. One skilled in the art of computer science will easily be able to combine the software created as described with appropriate general purpose or special purpose computer hardware to create a system. While the detailed embodiment of the present invention has been illustrated in detail, it should be apparent that modifications and adaptations to that embodiment may occur to one skilled in the art without departing from the scope of the present invention as set forth in the following claims.

What is claimed is:

1. A computer program product, stored on a computer-readable media for use in a computer system, for generating object code on the computer system for inclusion in a computer program having an executable object code, the computer system having a processor, said computer program product comprising:
   (a) instruction means for compiling or assembling a source code corresponding to the executable object code, wherein the source code contains data representative of a plurality of prerequisite programs which must be initialized prior to execution of the executable object code;
   (b) instruction means for forming, using the processor, a dependent control block (DCB) object code for specifying the plurality of prerequisite programs which must be initialized prior to execution of the executable object code, the processor assigning the DCB object code a selected symbolic name for identification purposes;
   (c) instruction means for writing, using the processor, in the DCB object code the data representative of the plurality of prerequisite programs which must be initialized prior to the execution of the executable object code; and
   (d) instruction means for storing, using the processor, the DCB object code together with the executable object code; thereby, creating a first object code.

2. The computer program product of claim 1 further comprising an instruction means for linking the DCB object code to a language list object code containing a plurality of external references to a plurality of symbolic names assigned to other DCB object codes by placing an address of the DCB object code in the language list object code; thereby forming a second object code.

3. The computer program product of claim 2 further comprising instruction means for linking the second object code to a program header object code by placing an address of the language list object code into the program header object code.

4. A computer program product, stored on a computer-readable media for use in a computer system, for processing a computer program comprising a plurality of dependent control blocks (DCBs) specifying a portion of a plurality of prerequisite support programs required to be initialized prior to execution of the computer program, wherein each of the plurality of prerequisite support programs may also contain a plurality of DCBs, said computer program product comprising:
   (a) instruction means for reading, using the processor, the plurality of dependent control blocks (DCBs) contained in the computer program;
   (b) instruction means for reading, using the processor, iteratively the DCBs, not previously read, contained in the plurality of prerequisite support programs to ascertain a further prerequisite support program required to be initialized prior to execution of the plurality of prerequisite support programs;
   (c) instruction means for adding the further prerequisite support program to the plurality of prerequisite support programs;
   (d) instruction means for repeating instruction means (b) and (c) until no further prerequisite support program is found; and
   (e) instruction means for initializing, using the processor, the plurality of prerequisite support programs in an order such that no prerequisite support program is initialized until all of its prerequisite support programs have been initialized.

5. The computer program product of claim 4 wherein the initializing instruction means further comprises:
   (a) instruction means for selecting, using the processor, one of the plurality of prerequisite support programs M;
   (b) instruction means for marking, using the processor, M as initializing, if M is uninitialized;
   (c) instruction means for recursively executing the instruction means beginning at instruction means (b) using M' as M for each of the plurality of prerequisite support programs M' on which M depends;
   (d) instruction means for initializing M using the processor;
   (e) instruction means for marking, using the processor, M as initialized; and
   (f) instruction means for returning, using the processor, to instruction means (c) at the point of recursion, if in a recursion.

6. The computer program product of claim 4 further comprising instruction means for recording an initialization order of the plurality of prerequisite support programs for use during termination.

7. The computer program product of claim 6 further comprising instruction means for terminating the plurality of prerequisite support programs in a reverse order from the initialization order after the computer program has completed execution.

8. The computer program product of claim 4 further comprising instruction means for reading, using the processor, a program header object code to locate the plurality of DCBs.

9. The computer program product of claim 4 further comprising:
   (a) instruction means for reading, using the processor, an address of a language list object code from a program header object code; and
   (b) instruction means for reading, using the processor, a plurality of addresses corresponding to the plurality of DCBs from the language list object code.

* * * * *